United States Patent
O'Brien et al.

(10) Patent No.: US 6,625,378 B2
(45) Date of Patent: Sep. 23, 2003

(54) VARIABLE OPTICAL ATTENUATOR DEVICE

(75) Inventors: Nada A. O'Brien, Santa Rosa, CA (US); J. Gordon H. Mathew, Santa Rosa, CA (US); Michael J. Cumbo, Santa Rosa, CA (US); Bryant P. Hichwa, Santa Rosa, CA (US); Robert W. Adair, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/972,023

(22) Filed: Oct. 5, 2001

(65) Prior Publication Data

US 2002/0090192 A1 Jul. 11, 2002

Related U.S. Application Data

(63) Continuation of application No. 09/241,620, filed on Feb. 1, 1999, now abandoned.

(51) Int. Cl.$^7$ .............................. G02B 6/32; G02B 6/36; G02F 1/09
(52) U.S. Cl. ........................... 385/140; 385/24; 385/32; 385/34; 359/283
(58) Field of Search .............................. 385/15–19, 24, 385/27, 31–35, 39–40, 47, 140; 359/577–590

(56) References Cited

U.S. PATENT DOCUMENTS

| | | | |
|---|---|---|---|
| 4,163,982 A | 8/1979 | DiDomenico, Jr. et al. | 357/2 |
| 4,245,883 A | 1/1981 | Johnson et al. | 385/17 |
| 4,257,671 A | 3/1981 | Barbaudy et al. | 385/33 |
| 4,443,057 A | 4/1984 | Bauer et al. | 359/604 |
| 4,505,539 A | 3/1985 | Auracher et al. | 385/19 |
| 4,516,827 A | 5/1985 | Lance et al. | 385/140 |
| 4,519,671 A | 5/1985 | Curtis et al. | 385/140 |
| 4,645,294 A | 2/1987 | Oguey et al. | 385/140 |

(List continued on next page.)

FOREIGN PATENT DOCUMENTS

| | | |
|---|---|---|
| WO | WO 99/55023 | 10/1999 |

OTHER PUBLICATIONS

Monk et al., *Electrochromism; Fundamentals and Applications, Construction of Electrochromic Devices*, ;; 49–53, 1995.
*Electrochemistry: Application to Electrochromic Materials*, CIEM2, Internet Publication, Oct. 1996.
Kim et al., *Electrochromism*, Internet Publication, Feb. 1998.
*Conducting Polymers and Electrochromic Devices*, Internet Publicaiton, Oct. 1998.
Palais J.C. Fiber Optic Communications, $4^{th}$ Ed., pp. 108–115, 234–244, 1998.
Cogan et al, *Electrchromic Devices for Optical Modulation in the Infrared*, Electrochromic Materials II, Electrochemical Society Proceedings vol. 94–2pp. 269–275, 1994.

*Primary Examiner*—Thong Nguyen
(74) *Attorney, Agent, or Firm*—Allen, Dyer, Doppelt, Milbrath & Gilchrist, P.A.

(57) ABSTRACT

A variable optical attenuator device is provided for modulating an optical signal. The attenuator device includes a variable attenuation assembly with an electrochromic structure interposed between a first electrode and a second electrode. The electrochromic structure is configured to reversibly change its optical characteristics from a bleached off state to a colored active state under the influence of an electrical potential applied to the first and second electrodes to thereby modulate the optical signal. The optical attenuator device includes at least one lens attached to the variable attenuation assembly. The lens cooperates with the variable attenuation assembly to direct the optical signal towards the electrochromic structure. Waveguides such as optical fibers define ports at the outer endface of the lens for the optical signal.

12 Claims, 9 Drawing Sheets

U.S. PATENT DOCUMENTS

| | | | |
|---|---|---|---|
| 4,697,869 A | 10/1987 | So et al. | 385/140 |
| 4,904,044 A | 2/1990 | Tamulevich | 385/56 |
| 4,917,477 A | 4/1990 | Bechtel et al. | 359/604 |
| 4,938,571 A | 7/1990 | Cogan et al. | 359/265 |
| 4,989,938 A | 2/1991 | Tamulevich | 385/33 |
| 5,050,954 A | 9/1991 | Gardner et al. | 385/33 |
| 5,111,331 A | 5/1992 | Rosenberg | 359/296 |
| 5,128,799 A | 7/1992 | Byker | 359/265 |
| 5,276,747 A | 1/1994 | Pan | 385/34 |
| 5,469,288 A | 11/1995 | Onaka et al. | 359/189 |
| 5,477,376 A | 12/1995 | Iwatsuka et al. | 359/283 |
| 5,677,977 A | 10/1997 | Smith | 385/140 |
| 5,694,512 A | 12/1997 | Gonthier et al. | 385/140 |
| 5,699,468 A | 12/1997 | Farries et al. | 385/140 |
| 5,757,993 A * | 5/1998 | Abe | 385/34 |
| 5,811,923 A | 9/1998 | Zieba et al. | 313/479 |
| 5,974,207 A * | 10/1999 | Aksyuk et al. | 385/24 |
| 6,055,347 A * | 4/2000 | Li et al. | 385/34 |
| 6,229,934 B1 * | 5/2001 | Melman et al. | 385/18 |

\* cited by examiner

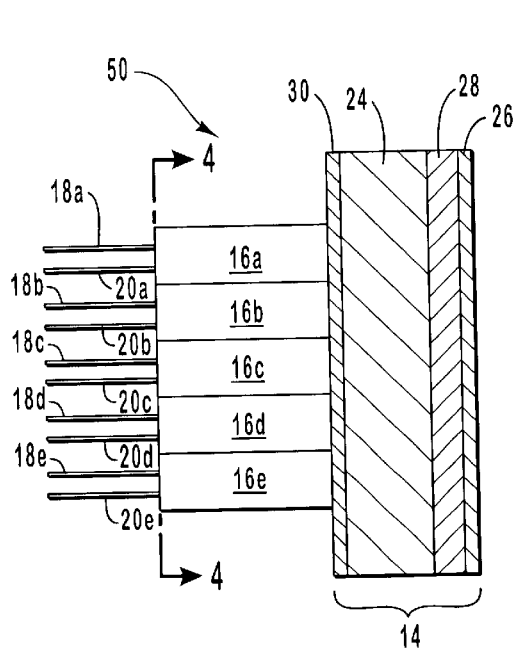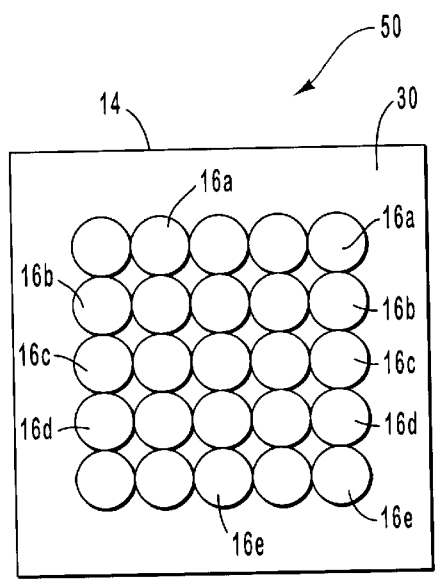
FIG. 3  FIG. 4
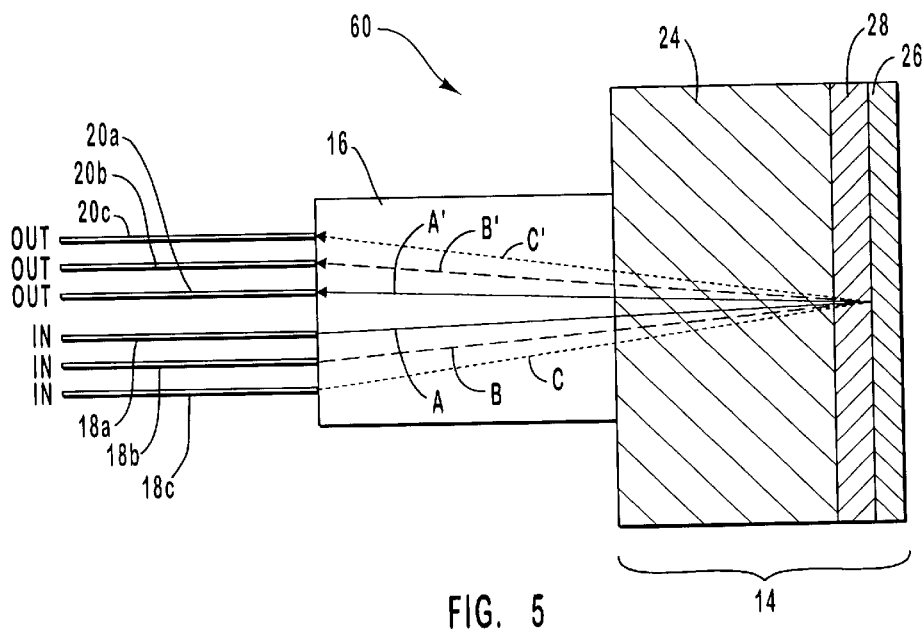
FIG. 5

VARIABLE OPTICAL ATTENUATOR DEVICE

CROSS-REFERENCE TO RELATED APPLICATION

This application is a continuation of application U.S. Ser. No. 09/241,620, filed Feb. 1, 1999, now abandoned.

BACKGROUND OF THE INVENTION

1. The Field of the Invention

The present invention generally relates to an optical device for attenuating electromagnetic radiation which propagates along a waveguide. More particularly the invention relates to an optical device for the variable attenuation of light within optical fibers.

2. The Relevant Technology

With the advances in technology in recent years, numerous attempts have been made to increase the flow of information between government agencies, private businesses and in general, from individual to individual. The need for information is ever increasing and hence many different types of transmission lines have been developed, such as optical fibers.

An optical fiber is a type of waveguide which allows the transmission of light along its length through the property of total internal reflection. The light beam or ray carries information as it propagates along the core of the optical fiber. The majority of the light beam remains within the core material since the core has a refractive index which is higher than the cladding material which surrounds the central core.

Optical fibers may be used to transmit information over both short or long distances, however, the optical properties of the optical fiber can be engineered based on the intended use. Furthermore, in optical communications, losses occur in light intensity and power along the length of the optical fiber. These losses are caused by absorption, scattering or geometric effects associated with the manufacture and use of the optical fiber. For example, light intensity is reduced by impurities contained within the optical fiber. Light is also absorbed due to splicing or connecting optical fibers and/or microscopic bending formed during fiber manufacture. Due to the variation in light intensity, the operation of the final optical components vary greatly, resulting in degradation of performance and efficiency. Optical attenuators provide a variety of useful functions to solve the above problems.

Optical attenuators perform numerous tasks associated with optical fiber communication. One function of an attenuator is to reduce the intensity of an optical signal which enters a photosensitive component. Photosensitive components are affected by variations in light intensity. Therefore, an attenuator causes the light intensity to be within the dynamic range of the photosensitive components. By using an attenuator, damage to the component is precluded. Additionally, the component does not become insensitive to small changes in the optical signal.

In other applications, attenuators serve as noise discriminators by reducing the intensity of spurious signals received by the optical device to a level below the device's response threshold. Moreover, optical attenuators are used to reduce the power of optical signals from an input fiber to an output fiber, and especially to balance optical power between several lines of an optical system. Many optical attenuators are also capable of actively attenuating an optical signal. Variable attenuators are required in some applications where different optical components require dissimilar incident optical signals, and hence variable sensitivities and saturation points. A fixed (i.e., passive) attenuation device is impractical for this purpose.

Attenuators serve to maintain the light level at a constant to compensate for component aging i.e., loss of efficiency in fiber amplifiers and reduced laser output from source, and changing absorption in optical waveguides. Variable attenuators serve to control feedback in optical amplifier control loops to maintain a constant output (e.g., as an automatic gain control element (AGC)).

Because of the variety of operations in which optical attenuators can be used, numerous types of optical attenuators have been developed. For example, U.S. Pat. No. 5,276,747 to Pan describes a liquid crystal optical attenuator device. This device uses a liquid crystal element which is manipulated to variably attenuate an incident light ray. The light travels through the liquid crystal element and is attenuated as the liquid crystal molecules are reoriented. Unfortunately, liquid crystals are temperature sensitive and hence as the temperature of the surrounding air varies, the optical properties of the liquid crystal also change. This results in inefficient transmission and inaccurate attenuation by the device.

Another group of optical attenuators are those which are mechanically activated. These vary in the method by which attenuation is caused. For example, one type of optical attenuator uses a rotatable filter placed between an input fiber and an output fiber. As the filter is rotated, the level of attenuation is varied. Another mechanical optical attenuator involves moving the ends of the input and output fibers such that the axis of the fibers are no longer aligned. By changing the angular misalignment between the input fiber and the output fiber the quantity of light transmitted along the output fiber is varied, hence variable attenuation occurs. In yet another mechanical attenuator the mechanism bends the optical fiber around a tapered or cylindrical element. As the element is rotated, different bending radii occur along the length of the optical fiber, thereby inducing radiation losses and hence variable attenuation. An alternative method of mechanically varying the attenuation of an optical signal is to use a moveable reflector, such as a mirror. As the mirror is moved, the angle at which the incident ray is reflected varies, thereby varying the light directed towards the output optical fiber, and causing attenuation.

Unfortunately, mechanical optical attenuators have the disadvantage that they use mechanical elements to either move the optical fiber or move elements which effect the optical fiber. These mechanical elements wear and eventually fail, resulting in a loss of attenuation. Furthermore, mechanical attenuators are relatively slow because of the mechanical movement compared to electrical, thermal, electromagnetic or similar movement found in other optical attenuators.

A hybrid type attenuator uses both mechanical movement of the optical fiber and modification of optical characteristics of the optical fiber. For example, U.S. Pat. No. 5,694,512 to Gonthier et al. discloses an optical attenuator which uses a tapered optical fiber. The fiber is heated and shaped to form the taper which acts to attenuate a given wavelength of light. This attenuator then may become a variable attenuator by applying a force to the optical fiber to bend the optical fiber and cause additional transmission losses. Numerous tapers and numerous bending elements may be used to vary the attenuation. Unfortunately, the movement of the optical fiber and/or bending of the optical fiber reduces the tensile strength of the optical fiber, thereby shortening the life of the fiber and hence the optical system. Furthermore, the stresses which are applied to the specific locations on the optical fiber can cause additional temperature stresses or temperature gradients along the optical fiber. The optical properties of the optical fiber are thereby changed, reducing control and effectiveness of the attenuator.

Another type of attenuator uses a series of Bragg gratings to attenuate various wavelengths of light. A Bragg grating acts as a filter to transmit and reflect different wavelengths of incident light. The Bragg grating is formed by exposing the core of the optical fiber to a beam of ultraviolet (UV) light. The UV light produces a permanent refractive index variation in the core of the optical fiber which reflects and transmits different wavelengths of incident light. Unfortunately, Bragg gratings are fixed in the optical fiber. The molecular structure of the fiber is modified to prevent the passage of a required wavelength of light. Once the optical fiber is modified, it cannot be reversed. Furthermore, one Bragg grating will only attenuate a given wavelength and cannot be varied. To form a variable attenuator using Bragg gratings it is necessary to direct the light or optical signal through multiple fibers and multiple Bragg gratings. Consequently, there is an increase in size and cost associated with this type of attenuator.

Finally, another type of attenuator uses an electrochromic element to cause attenuation of incident light within a waveguide. In U.S. Pat. No. 4,245,883 to Johnson et al., a number of waveguides are completely or partially embedded in or supported by a substrate which also serves as an optical cladding. The waveguides are bonded to an electrochromic body which allows for the attenuation of the light incident within the waveguides. As the light travels within the fixed waveguides, the light comes into contact with the electrochromic body. As a current is applied between a pair of conductor layers, the optical characteristics of the electrochromic body vary and cause attenuation of the incident light. Unfortunately, the light within the waveguide travels parallel to the conductors and passes through the entire width of the electrochromic body. The electrochromic layer is therefore relatively thick in relation to the propagating light. Additionally, the waveguides are fixed to the substrate which reduces the effective use of the attenuator since the substrate is formed from a solid member.

It would therefore be an advance to provide a variable optical attenuator which overcomes the above problems.

SUMMARY AND OBJECTS OF THE INVENTION

It is an object of the present invention to provide an optical attenuator having no moving parts and which has broad band capability.

A further object of the present invention is to provide an optical attenuator which is compact in size and relatively inexpensive.

It is another object of the present invention to provide an optical attenuator which is wavelength independent and non-polarizing.

Still yet another object of the present invention is to provide an optical attenuator which is polarization insensitive while retaining a broad bandwidth.

To achieve the foregoing objects, and in accordance with the invention as embodied and broadly described herein, a variable optical attenuator device is provided for modulating an optical signal. The attenuator device includes a variable attenuation assembly with an electrochromic structure interposed between a first electrode and a second electrode. The electrochromic structure is configured to change its optical characteristics from a bleached off state to a colored active state under the influence of an electrical potential applied to the first and second electrodes to thereby modulate the optical signal. The optical attenuator device includes at least one lens attached to the variable attenuation assembly. The lens cooperates with the variable attenuation assembly to direct the optical signal towards the electrochromic structure. Waveguides such as optical fibers define ports at the outer endface of the lens for the optical signal.

The first electrode in the variable attenuation assembly is configured to be transmissive to an optical signal from an input waveguide attached to the lens. In one embodiment, the second electrode is configured to reflect the optical signal back towards the lens and into an output waveguide attached to the lens. In an alternative embodiment, an additional lens is attached to the variable attenuation assembly on the second electrode, which is configured to be transmissive to the optical signal. An output waveguide is attached to the additional lens for receiving the optical signal transmitted through the second electrode.

In other embodiments of the invention, multichannel variable optical attenuators are provided by attaching multiple lenses and/or waveguides to the variable attenuation assembly.

In a method for attenuating an optical signal according to the present invention, a variable attenuation assembly is provided including an electrochromic structure interposed between a first electrode and a second electrode, with the first electrode being transparent to an optical signal. An optical signal is directed to the variable attenuation assembly and is allowed to pass into and out of the variable attenuation assembly with substantially no loss in signal strength during an inactive state. An electrical potential is applied to the first and second electrodes such that the electrochromic structure attenuates the optical signal to a desired level during an active state.

These and other objects and features of the present invention will become more fully apparent from the following description and appended claims, or maybe learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 is a schematic side view of a multichannel variable optical attenuator device according to the present invention;

FIG. 4 is a front view of the variable optical attenuator device of FIG. 3 taken along line 4—4 of FIG. 3;

FIG. 5 is a schematic side view of another embodiment of a multichannel variable optical attenuator device according to the present invention;

DETAILED DESCRIPTION OF THE INVENTION

Figure 1:
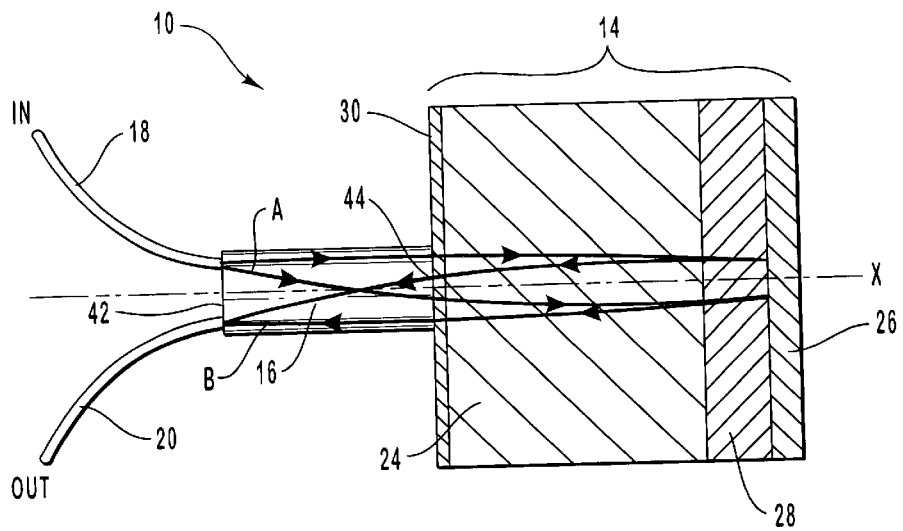
FIG. 1 is a schematic side view of one embodiment of a variable optical attenuator device according to the present invention.

The present invention is directed to a variable optical attenuator device and methods for making the same. The variable optical attenuator (VOA) device of the present invention modulates an optical signal while allowing fast switching responses without high insertion losses. The VOA device may attenuate different wavelengths of an optical signal as necessary for the particular photo-electric component used in an optical fiber system.

The VOA device of the invention has the advantage of no mechanical or moving parts in order to attenuate an optical signal. Furthermore, the VOA device is compact and relatively inexpensive.

Referring to the drawings, wherein like structures are provided with like reference designations, the drawings are schematic and graphical representations showing various aspects and embodiments of the present invention.

FIG. 1 depicts a VOA device 10 according to one embodiment of the invention. In general, the device 10 includes a variable attenuation assembly 14, a lens 16, a first input waveguide 18 and a second output waveguide 20. Each of these components will be discussed in further detail as follows.

The attenuation assembly 14 has a first electrode 24, which is an electrically conductive substrate, and an opposing second electrode 26. An electrochromic structure 28 is interposed between first electrode 24 and second electrode 26. The attenuation assembly 14 can also optionally have an antireflection film 30 on the outer surface of electrode 24.

In general, the attenuation assembly 14 is configured to transform from an off state ("bleached") to an active powered state ("colored"). That is, attenuation assembly 14 either directs the incident optical signal such as a beam of light from input waveguide 18 to output waveguide 20 in the off state, or variably absorbs the optical signal in the powered state. The attenuation assembly 14 is also configured to provide remote controlled variable attenuation of an optical signal with a high dynamic range, while providing low insertion losses and a relatively short response time.

As shown in FIG. 1, first electrode 24 is transparent to an optical signal (represented by arrows A and B) such as a given wavelength of light, while second electrode 26 reflects the optical signal. The electrodes 24 and 26 are configured such that an electrical potential can be applied thereto. The first electrode 24 can have a thickness from about 1 $\mu$m to about 10 mm, and preferably from about 0.5 mm to about 5 mm. The second electrode 26 can have a thickness from about 500 Å to about 5000 Å, and preferably from about 1000 Å to about 2000 Å.

The first electrode 24 is preferably composed of a material which is conductive while being transparent to a given wavelength of light incident to electrode 24. Examples of suitable materials for electrode 24 include doped crystalline silicon, gallium arsenide (GaAs), indium tin oxide (commonly referred to as ITO), germanium ($2<\lambda<18$ $\mu$m), aluminum-doped zinc oxide, combinations thereof, and the like. It is preferred, in one illustrative embodiment, that electrode 24 be substantially composed of single crystal silicon doped with boron, phosphorus, or arsenic, such that electrode 24 is transparent to an infrared optical signal.

It should be noted that with coherent radiation (i.e., laser light), interference effects will result in variation in transmission with wavelength. These effects can be eliminated by polishing the conductive substrate such as electrode 24 with a wedged front surface that faces lens 16. The degree of wedging should be in the range from about 0.25° to about 2°, and preferably from about 0.5° to about 1° for silicon substrates.

The second electrode 26 is preferably composed of a material which is conductive while being reflective to a given wavelength of light incident to electrode 26. Suitable materials for electrode 26 include aluminum, gold, silver, copper, rhodium, combinations or alloys thereof, and the like. It is preferred that second electrode 26 be substantially composed of aluminum or gold when an infrared optical signal is to be reflected.

As discussed in further detail below, attenuation assembly 14 may include solid state electrochromic media in electrochromic structure 28, such as dielectric metal oxides or ion conducting polymers. In addition, other types of electrochromic systems may be used in variable attenuation assembly 14, such as solution or gel electrochromic media.

Figure 2:
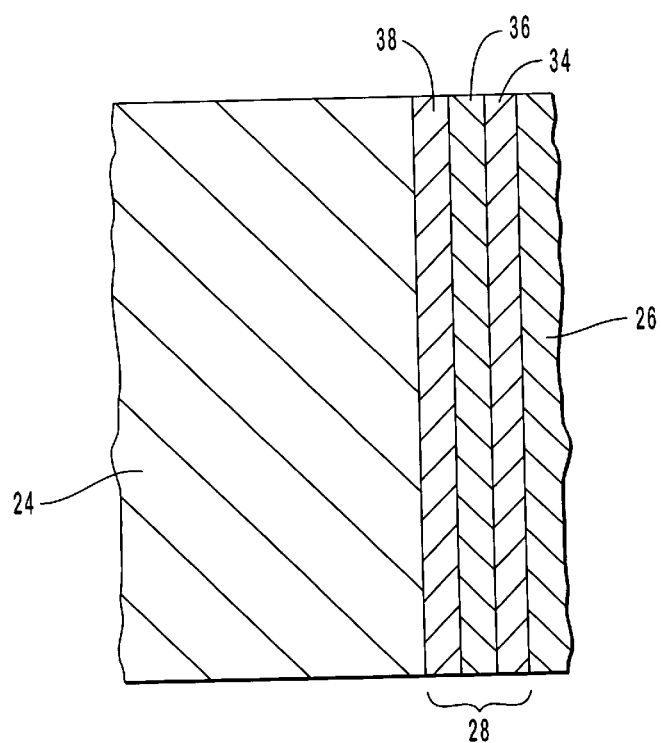
FIG. 2 is a schematic partial side view of the variable optical attenuator device of FIG. 1.

In one preferred embodiment depicted in FIG. 2, electrochromic structure 28 includes solid state media, with a cathodically coloring layer 34 abutting second electrode 26, and an anodically coloring layer 38 abutting first electrode 24. An ion conductor layer 36 is interposed between coloring layers 34 and 36. The electrochromic structure 28 can have a thickness from about 800 Å to about 20,000 Å, and preferably from about 3500 Å to about 7500 Å.

The cathodically coloring layer 34 is preferably composed of materials which will provide reversible reflection and/or absorption characteristics under an electrical potential. Non-limiting examples of suitable materials for coloring layer 34 include tungsten oxide ($WO_3$), molybdenum oxide ($MoO_3$), titanium oxide ($TiO_2$), niobium oxide ($Nb_2O_5$), combinations thereof, and the like. In one preferred embodiment, coloring layer 34 is substantially composed of $WO_3$. The coloring layer 34 can have a thickness from about 400 Å to about 2000 Å, and preferably from about 900 Å to about 1500 Å.

The anodically coloring layer 38 is preferably composed of materials that will provide reversible reflection and/or absorption characteristics under an electrical potential. Suitable materials for coloring layer 38 include nickel oxide (NiO), iridium oxide ($IrO_x$), vanadium pentoxide ($V_2O_5$), iridium nitrogen oxide ($IrO_xN$), titanium cerium oxide, zirconium cerium oxide, polyaniline, polypyrrole, prussian blue (ferric ferrocyanide), combinations thereof, and the like. In one preferred embodiment, coloring layer 38 is substantially composed of $IrO_x$. The coloring layer 38 may have a thickness from about 100 Å to about 500 Å, and preferably from about 200 Å to about 300 Å.

The ion conductor layer 36 between coloring layers 34 and 38 is preferably composed of a dielectric material which is electrically nonconductive. Suitable materials for ion conductor layer 36 include tantalum pentoxide ($Ta_2O_5$), silicon dioxide ($SiO_2$), aluminum oxide ($Al_2O_3$), zirconium oxide ($ZrO_2$), lithium niobate ($LiNbO_3$), antimony oxide ($Sb_2O_5$), combinations thereof, and the like. In one preferred embodiment, ion conductor layer 36 is substantially composed of $Ta_2O_5$. The ion conductor layer 36 may have a thickness from about 500 Å to about 4000 Å, and preferably from about 1500 Å to about 2000 Å.

The electrochromic structure 28 is changed from a bleached off state to a colored active state by applying an electrical potential to first electrode 24 and second electrode 26. As the electrical potential is applied, the optical characteristics, such as absorption and refractive index, of coloring layers 34 and 38 of electrochromic structure 28 change and hence cause a variable attenuation of the optical signal passing therethrough.

One skilled in the art can identify various other configurations for electrochromic structure 28 which are also effective in carrying out the intended function thereof. For example, the dimensions of electrochromic structure 28 maybe varied depending on the type of use to be performed. In alternative configurations, electrochromic structure 28 may utilize a solution or a gel electrochromic medium which is contained in a sealed compartment between the electrodes. Examples of suitable solution or gel electrochromic systems are disclosed in U.S. Pat. No. 5,128,799 to Byker, and in Monk et al., Electrochromism: Fundamentals and Applications, pp.49–50 (1995), the disclosures of which are incorporated herein by reference.

The antireflection film 30 on the outer surface of electrode 24 is a conventional antireflective coating which can be formed of one or more optical layers of high and/or low refractive index materials. The antireflection film 30 is employed to enhance the transmission of the optical signal from lens 16 into and out of attenuation assembly 14. The antireflection film 30 prevents incident light from being reflected such that substantially all of the light passes into first electrode 24. The antireflection film 30also serves to maximize the contrast between the unattenuated and fully attenuated states of VOA device 10.

The attenuation assembly 14 may have various cross-sectional shapes, such as circular, square, rectangular, oval, trapezoidal, and the like. The various components of attenuation assembly 14 are accordingly dimensioned and sized to operatively cooperate with each other.

Each of the component layers in a solid state attenuation assembly of the invention may be formed through various conventional techniques known by those skilled in the art. Such techniques include physical vapor deposition (PVD) such as evaporation or sputtering, chemical vapor deposition (CVD), sol-gel, and the like. For example, the layers of electrochromic structure 28 may be formed by depositing appropriate materials on one surface of a preformed substrate which will be utilized as electrode 24. A conductive layer that will be utilized as electrode 26 can then be deposited on the formed electrochromic structure 28. The antireflection film 30 can be formed by conventional techniques on the opposite surface of the substrate from electrochromic structure 28.

The lens 16 of VOA device 10 is preferably a gradient refractive index (GRIN) lens. The lens 16 includes an outer endface 42 and an inner endface 44, with an optical axis x therebetween. The inner endface 44 of lens 16 is attached to attenuation assembly 14 via a suitable optical attachment means such as by a transparent adhesive or by other traditional optical bonding techniques, including thermal bonding, laser welding, UV bonding, or the like. The outer endface 42 acts as a focusing end for lens 16 while inner endface 44 acts as a collimating end. Hence, the optical signal incident to lens 16 is focused by outer endface 42 and is collimated by inner endface 44. In general, lens 16 is configured to focus the incident optical signal towards electrochromic structure 28 of attenuation assembly 14.

One skilled in the art can identify various other configurations for lens 16 which are also effective in carrying out the intended function thereof. For example, lens 16may be another type of lens which is capable of directing the incident optical signal in the desired direction, such as a microlens, refractive lens, diffractive lens, fresnel lens, ball lens, spherical lens, aspheric lens, and the like. In another configuration, a series of converging and diverging lenses which perform the same function as the GRIN lens may be employed. In other embodiments, a plurality of lenses and waveguides may be formed on attenuation assembly 14 as discussed in further detail below.

The input waveguide 18 and output waveguide 20 of VOA device 10 are preferably optical fibers. It will be appreciated, however, that any type of waveguide which transmits an optical signal with minimal loss in optical power and intensity can also be utilized. The waveguide 18 is attached to lens 16 on one side of the optical axis, with waveguide 18 providing an input path for an optical signal into lens 16 and defining a first port at outer endface 42 of lens 16 for the optical signal. The waveguide 20 is attached to lens 16 on the opposite side of the optical axis from waveguide 18, providing an output path for the optical signal from attenuation assembly 14 and defining a second port for the optical signal at outer endface 42 of lens 16. The waveguides 18 and 20 are attached to outer endface 42 of lens 16 by a suitable optical attachment means such as discussed above.

Various other configurations of waveguides 18 and 20 are also effective in carrying out the intended function thereof. For example, first waveguide 18 and second waveguide 20 may have various cross-sectional shapes such as square, circular, oval, rectangular, or the like.

The VOA device of the present invention may be configured to accommodate various wavelengths of an optical signal to be attenuated. Such optical signal wavelengths may range from about 0.2 µm to about 20 µm. In a preferred configuration, the VOA device can attenuate optical signals in the near-infrared wavelength range of from about 1200 nm to about 2500 nm.

During operation of VOA device 10, an optical signal such as a light beam passes along waveguide 18 and into lens 16. As depicted in FIG. 1, lens 16 focuses the light beam A at a given location on second electrode 26. The light beam is reflected by second electrode 26 with substantially no loss in signal strength during an inactive bleached state. The reflected light beam B is directed by lens 16 into waveguide 20 as shown in FIG. 1. An electrical potential is applied to electrodes 24 and 26 such that electrochromic structure 28 at least partially absorbs the light beam to a desired attenuation level during an active colored state. As differing electrical potentials are applied to electrodes 24 and 26, the coloring layers in electrochromic structure 28 change, resulting in varying degrees of attenuation.

FIGS. 3 and 4 illustrate another embodiment of the invention in the form of a multichannel VOA device 50. The device 50 includes similar components as discussed above for device 10, including a variable attenuation assembly 14 having an electrochromic structure 28 interposed between a pair of electrodes 24 and 26. An antireflection film 30 can also be formed on the outer surface of electrode 24 as shown in FIG. 3.

The multichannel device 50 includes a plurality of lenses 16a–16e which are attached to attenuation assembly 14, such as a plurality of GRIN lenses. As shown in FIG. 4, the lenses 16a–16e are positioned in an array of rows and columns on attenuation assembly 14. Furthermore, each of lenses 16a–16e has an associated first waveguide 18a–18e such as an input optical fiber and a second waveguide 20a–20e such as an output optical fiber, as shown in FIG. 3.

In the operation of device 50, attenuation assembly 14 functions in the same manner as discussed above for device 10, except that attenuation assembly 14 is capable of variably attenuating multiple channels of input optical signals simultaneously from waveguides 18a–18e when in the active powered state.

FIG. 5 illustrates another embodiment of the invention in the form of a three-channel VOA device 60. The device 60 includes similar components as discussed above for device 10, including a variable attenuation assembly 14 having an electrochromic structure 28 interposed between a pair of electrodes 24 and 26. A single lens 16, such as a GRIN lens, is attached to attenuation assembly 14.

As shown in FIG. 5, lens 16 of device 60 is provided with three input waveguides 18a–18c and three output waveguides 20a–20c. These input and output waveguides are preferably optical fibers.

In the operation of device 60, attenuation assembly 14 functions in the same manner as discussed above for device 10, except that attenuation assembly 14 is capable of variably attenuating three channels of input optical signals simultaneously from input waveguides 18a–18c when in the active powered state. For example, input optical signals, represented by arrows A, B and C in FIG. 5, are directed by lens 16 into attenuation assembly 14 and are reflected by second electrode 26 toward output waveguides 20a–20c, with the reflected signals represented by arrows A', B' and C'. In the active powered state, the input optical signals are simultaneously attenuated by attenuation assembly 14. The device 60 provides the capability of modulating separate optical channels to a common attenuation level.

Figure 6A:
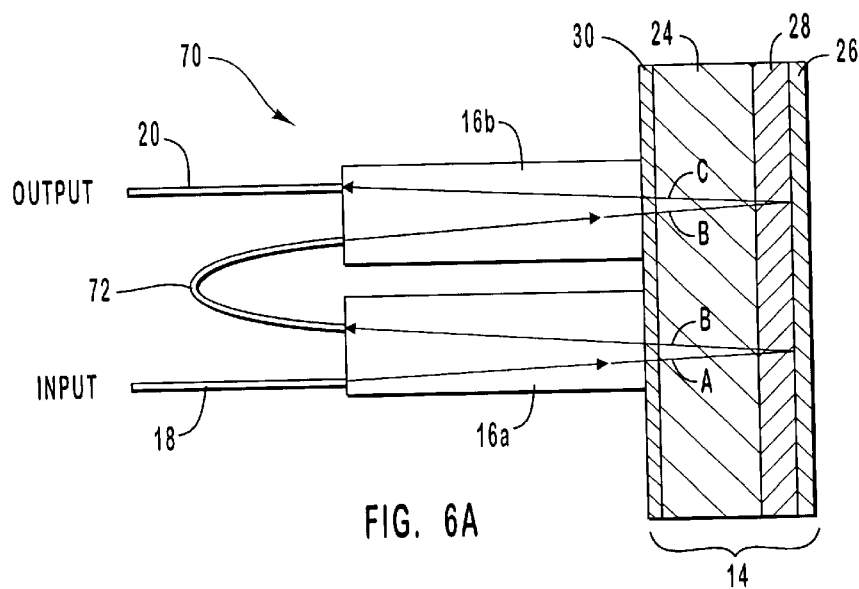
FIG. 6A is a schematic side view of a cascaded variable optical attenuator device according to one embodiment of the present invention.

FIG. 6A illustrates another embodiment of the invention in the form of a cascaded VOA device 70. The device 70 includes similar components as discussed above for device 10, including a variable attenuation assembly 14 having an electrochromic structure 28 interposed between a pair of electrodes 24 and 26. An antireflection film 30 can also be formed on the outer surface of electrode 24 as shown in FIG. 6A.

A pair of lenses 16a and 16b, such as GRIN lenses, are attached to variable attenuation assembly 14. The lens 16a is provided with an input waveguide 18 such as an optical fiber, and lens 16b is provided with an output waveguide 20.

A transfer waveguide 72 such as an optical fiber is attached to the outer endfaces of lenses 16a and 16b to form an optical bridge between the lenses, with transfer waveguide 72 providing an output port for lens 16a and an input port for lens 16b.

In the operation of device 70, attenuation assembly 14 functions in the same manner as discussed above for device 10, except that attenuation assembly 14 is capable of serially attenuating an optical signal. For example, an input optical signal, represented by arrow A in FIG. 6A, is directed by lens 16a into attenuation assembly 14 and is reflected at a first location from second electrode 26 toward transfer waveguide 72, with the reflected signal represented by arrow B. The reflected signal B is directed through transfer waveguide 72 to lens 16b, which directs signal B into attenuation assembly 14 again. The signal B is reflected at a second location from second electrode 26 toward waveguide 20, with the reflected signal represented by arrow C. In the active powered state, optical signal A is attenuated to a first reduced level by attenuation assembly 14 and is directed as reflected signal B through transfer waveguide 72 to lens 16b. The signal B is input into attenuation assembly 14 again, is further attenuated to a second reduced level, and is reflected by second electrode 26 as signal C toward waveguide 20. Hence, a cascaded attenuation effect is provided by device 70.

Through use of device 70, in which the output of one channel is connected to the input of an adjacent channel, greater attenuation may be achieved. Thus, the optical signal is attenuated by a percentage squared. It should be appreciated that additional transfer waveguides 72 may be used to interconnect additional lenses on device 70 to further increase the percentage of attenuation if desired.

Figure 6B:
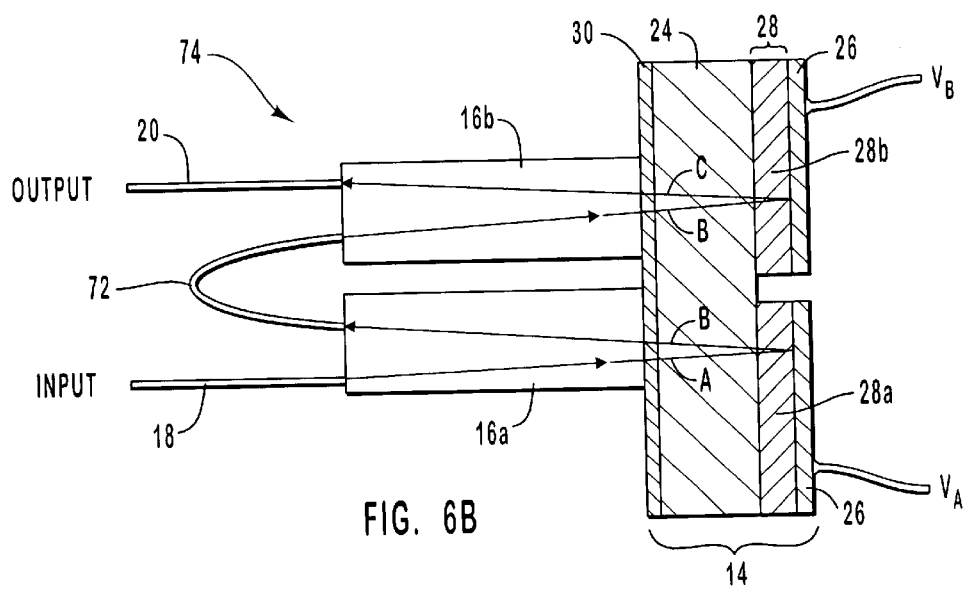
FIG. 6B is a schematic side view of a cascaded variable optical attenuator device according to an alternative embodiment of the present invention.

FIG. 6B illustrates a cascaded VOA device 74 according to an alternative embodiment of the invention. The device 74 includes similar components as discussed above for device 70, including a variable attenuation assembly 14 having an electrochromic structure 28 interposed between a pair of electrodes 24 and 26. An antireflection film 30 can also be formed on the outer surface of electrode 24. A pair of lenses 16a and 16b are attached to attenuation assembly 14. The lens 16a is provided with an input waveguide 18 and lens 16b is provided with an output waveguide 20. A transfer waveguide 72 is attached to the outer endfaces of lenses 16a and 16b to form an optical bridge between the lenses.

As shown in FIG. 6B, electrochromic structure 28 is appropriately partitioned, such as by laser ablation, in order to form independently variable electrochromic portions 28a and 28b. Separate electrical connections VA and VB are made to each of electrochromic portions 28a and 28b. This provides for independent application of varying voltage levels to each of electrochromic portions 28a and 28b.

The device 74 operates in a similar manner as discussed above for device 70 in serially attenuating an optical signal, except that independent voltage levels can be applied to electrochromic portions 28a and 28b to achieve a desired attenuation effect. If additional transfer waveguides and lenses are utilized with device 74, then electrochromic structure 28 can be further partitioned into additional electrochromic portions and provided with independent electrical connections to each electrochromic portion.

Figure 7:
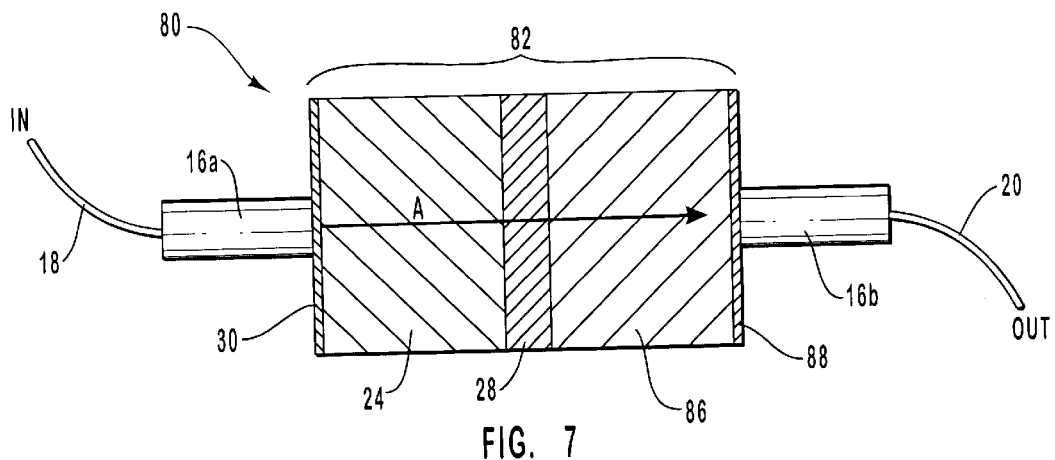
FIG. 7 is a schematic side view of another embodiment of a variable optical attenuator device according to the present invention.

FIG. 7 illustrates an alternative embodiment of the invention in the form of a transmissive VOA device 80. The device 80 includes similar components as discussed above for device 10, except that device 80 is configured for transmission, instead of reflection, of an optical signal. Thus, device 10 has a variable attenuation assembly 82 with an electrochromic structure 28 abutting a first electrode 24 which is transmissive to a given optical signal. A second electrode 86 is also provided such that electrochromic structure 28 is interposed between electrodes 24 and 86. The second electrode 86 can be attached to electrochromic structure 28 by a suitable optical attachment means such as those discussed above. The electrode 86 is also transmissive to the same optical signal as electrode 24 and can be composed of the same materials. An antireflection film 30 can be formed on the outer surface of electrode 24. In addition, an antireflection film 88 can also be optionally formed on the outer surface of electrode 86, as shown in FIG. 7.

A first lens 16a, such as a GRIN lens, is attached to one side of attenuation assembly 82, and a matching second lens 16b is attached to an opposing side of attenuation assembly 82 directly opposite from first lens 16a. An input waveguide 18 such as an optical fiber is attached to the outer endface of lens 16a, and an output waveguide 20 is attached to the outer endface of lens 16b.

In the operation of device 80, an optical signal such as a light beam is directed into lens 16a from waveguide 18 and is passed through first electrode 24, with the signal represented by arrow A in FIG. 7. The signal A travels through or is absorbed by electrochromic structure 28, depending on whether electrochromic structure 28 is in the bleached off state or the active powered state. Any signal that is not attenuated passes through electrochromic structure 28 and second electrode 86 into lens 16b, which directs the signal to waveguide 20.

It should be understood that the previously discussed attenuator embodiments of the invention shown in FIGS. 3–6, which utilize reflective second electrodes, can be reconfigured from reflective to transmissive devices in that transmissive second electrodes can be utilized such as described above for device 80. The reflective electrode would be replaced by a transmissive conducting layer, with the output signal collected by a GRIN lens and waveguide combination thereon, such as shown for device 80 in FIG. 7.

Figure 8:
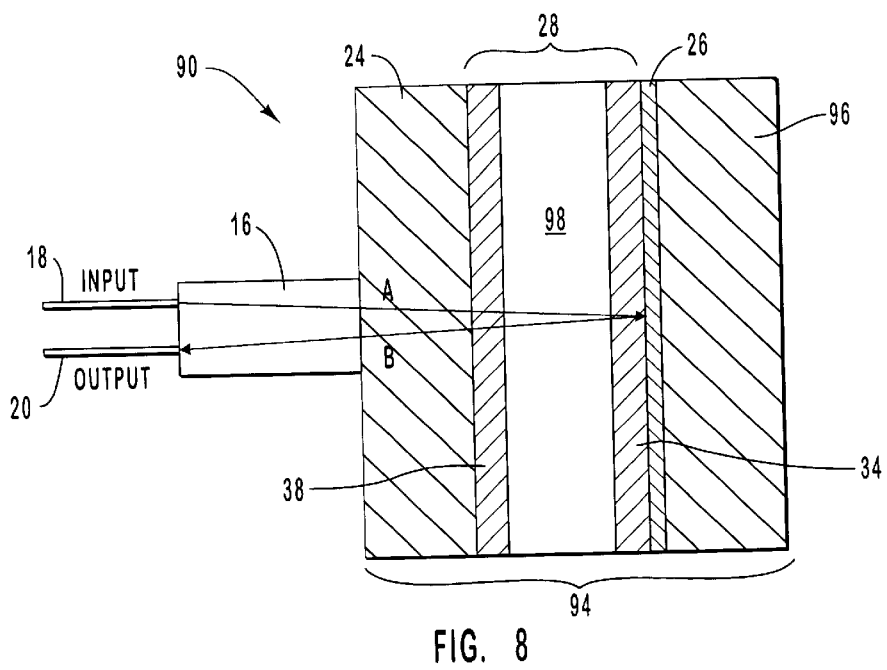
FIG. 8 is a schematic side view of a further embodiment of a variable optical attenuator device according to the present invention.

FIG. 8 illustrates yet another embodiment of the invention in the form of a laminated VOA device 90. The device 90 includes similar components as discussed above for device 10, except that the components of device 90 are laminated together from preformed structures. Thus, device 90 has a variable attenuation assembly 94 which includes a first electrode 24 and a second electrode 26, with an electrochromic structure 28 interposed between electrodes 24 and 26. A lens 16, such as a GRIN lens, is attached to attenuation assembly 94. An input waveguide 18 and an output waveguide 20, such as optical fibers, are attached to the outer endface of lens 16.

A substrate 96, which can be composed of glass or silicon, is utilized as a support in a first preformed structure for device 90. In fabricating the first preformed structure, a conductive layer of reflective material is formed on substrate 96 to form second electrode 26. Thereafter, a cathodically coloring layer 34 for electrochromic structure 28 is formed on electrode 26 to complete the first preformed structure. In a second preformed structure for device 90, first electrode 24 is utilized as a substrate for forming anodically coloring layer 38 thereon which is to be part of electrochromic structure 28. The layers on the preformed structures can be formed by conventional deposition or sputtering techniques.

An ion conductor layer 98 composed of polymeric materials that are ion conducting is disposed between the first and second preformed structures and acts as an adhesive layer for securing the preformed structures together. Suitable ion conducting polymeric materials include polymethyl methacrylate (PMMA), polyethylene oxide (PEO), polymers of 2-acrylamido-2-methylpropanesulfonic acid (Poly AMPS®, available from Lubrizol), polyethylene imide (PEI), combinations thereof, and the like.

In the operation of device 90, attenuation assembly 94 functions in the same manner as discussed above for attenuation assembly 14 of device 10. Thus, during operation of device 90, an optical signal passes along input waveguide 18 and into lens 16. The lens 16 focuses the light beam, represented by arrow A in FIG. 8, at a given location on second electrode 26. The light beam is reflected by second electrode 26 with substantially no loss in signal strength during an inactive bleached state. The reflected light beam, represented by arrow B in FIG. 8, is directed by lens 16 into output waveguide 20. When an electrical potential is applied to electrodes 24 and 26, electrochromic structure 28 at least partially absorbs the light beam to a desired attenuation level.

It should be understood that device 90 can be reconfigured from a reflective to a transmissive device in that a transmissive second electrode can be utilized such as described above for device 80. The reflective electrode 26 formed on substrate 96 would be replaced by a transmissive substrate/electrode similar to electrode 24. The output signal would be collected by a GRIN lens and waveguide combination attached to the outer surface of the transmissive electrode, such as shown for device 80 in FIG. 7.

The VOA devices of the present invention provides many benefits and have a variety of applications. For example, the devices can be used to reduce power in an optical fiber to prevent saturation or overload of an optical receiver. In addition, the devices can compensate for increased loss as specific optical components degrade over years of service. The devices can also be used to simulate cable loss for laboratory testing of power limits of optical communication links.

Further, the VOA devices of the invention can be used in wavelength division multiplexing (WDM) systems to provide optical power equalization between WDM channels. The devices are also useful for amplifier gain optimization in EDFA systems (e.g., in erbium-doped optical amplifiers).

The following examples are given to illustrate various features of the present invention, and are not intended to limit the scope of the present invention.

EXAMPLE 1

A VOA device was fabricated according to the present invention to have a structure similar to the device shown in FIGS. 1 and 2. The attenuation assembly of the VOA device included the components and materials listed in Table 1 below. With this particular configuration, the diameter of the attenuation assembly was 8 mm. A GRIN lens with input and output optical fibers was attached to the attenuation assembly such as shown for the device of FIG. 1.

TABLE 1

| Component | Material |
| --- | --- |
| antireflection film 30 | multilayer antireflection coating |
| first electrode 24 | silicon |
| anodically coloring layer 38 | iridium nitrogen oxide (IrO$_x$N) |

TABLE 1-continued

| Component | Material |
| --- | --- |
| ion conductor layer 36 | tantalum pentoxide (Ta$_2$O$_5$) |
| cathodically coloring layer 34 | tungsten oxide (WO$_3$) |
| second electrode 26 | gold |

Figure 9:
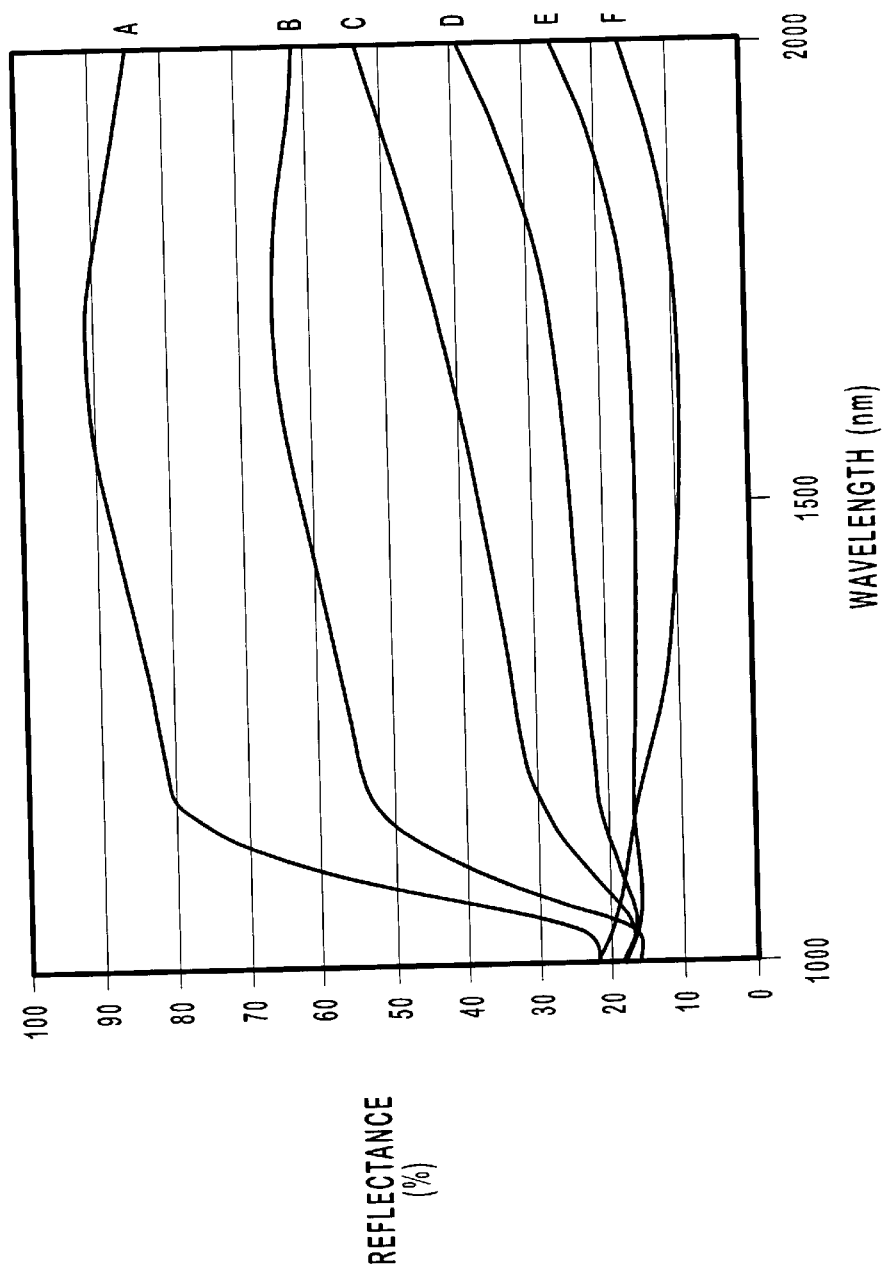
FIG. 9 is a graphical representation of the operation of a variable optical attenuator device of the present invention showing the reflectance as a function of wavelength.

FIG. 9 is a spectral performance graph of the operation of the VOA device of Example 1, showing the percent reflectance as a function of wavelength for the near infrared region of the electromagnetic spectrum. A number of different tests of the VOA device were performed with varying electrical potentials, from −1.0 volt (bleached) to 1.8 volts (fully colored). As a result, the curves A–F shown in the graph of FIG. 9 were obtained.

Curve A in the graph of FIG. 9 represents the reflectance obtained when an electrical potential of −1.0 V was applied. In this condition, the electrochromic structure is in the bleached off state and therefore substantially all of the optical signal from the input optical fiber is reflected from the second electrode to the output optical fiber. As shown in FIG. 9, at the wavelength range from about 1500 nm to about 1700 nm, the reflectance went above 90%.

Curve B represents the reflectance obtained when an electrical potential of 0.5 V was applied. Again for the wavelength range of about 1500 nM to about 1700 nm, the percent reflectance dropped to between about 60% and 70%.

Curve C represents the reflectance obtained when an electrical potential of 1.0 V was applied. For the wavelength range of about 1500 nm to about 1700 nm, the percent reflectance dropped to between about 35% and 45%.

Curve D represents the reflectance obtained when an electrical potential of 1.2 V was applied. For the wavelength range of about 1500 nm to about 1700 nm, the percent reflectance dropped to between about 25% and 30%.

Curve E represents the reflectance obtained when an electrical potential of 1.4 V is applied. The percent reflectance dropped to between about 15% and 20% for the wavelength of about 1500 nm to about 1700 nm.

Curve F represents the reflectance obtained when an electrical potential of 1.8 V was applied. For the wavelength of about 1500 nm to about 1700 nm, the percent reflectance dropped below about 10%.

Figure 10:
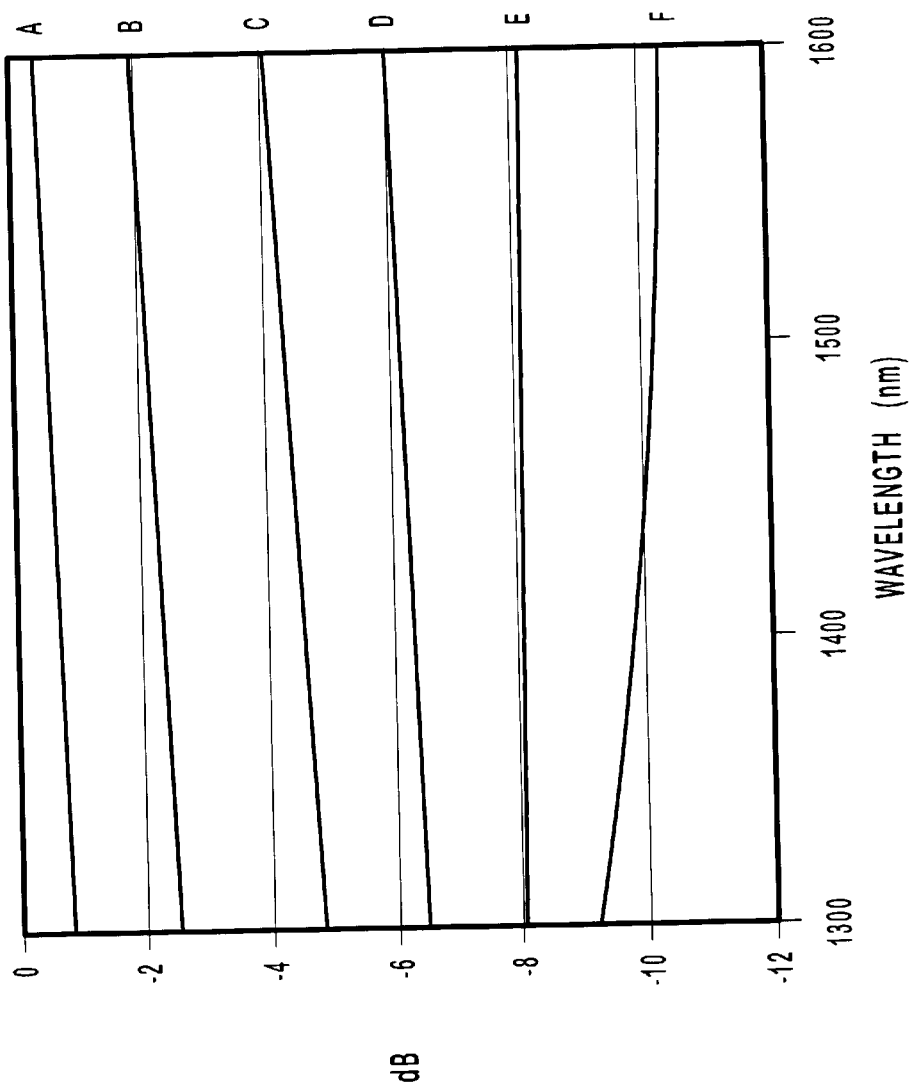
FIG. 10 is an alternative graphical representation of the data depicted in FIG. 9.

FIG. 10 is a graph representing the same test results obtained for the VOA device of Example 1 described in connection with FIG. 9, except that the percent reflectance has been converted to decibel (dB) units (dB=10Log (%Reflect.)) for curves A–F for a wavelength range of 1300 to 1600 nm. FIG. 10 shows the flatness (or broad band) of the response within this wavelength range. This is an important property for VOA devices, especially within the wavelength range of interest from about 1525 nm to about 1565 nm. While FIG. 10 shows 10 dB attenuation for a VOA device of the invention, it should be noted that up to about a 20 dB range can be achieved.

EXAMPLE 2

Figure 11:
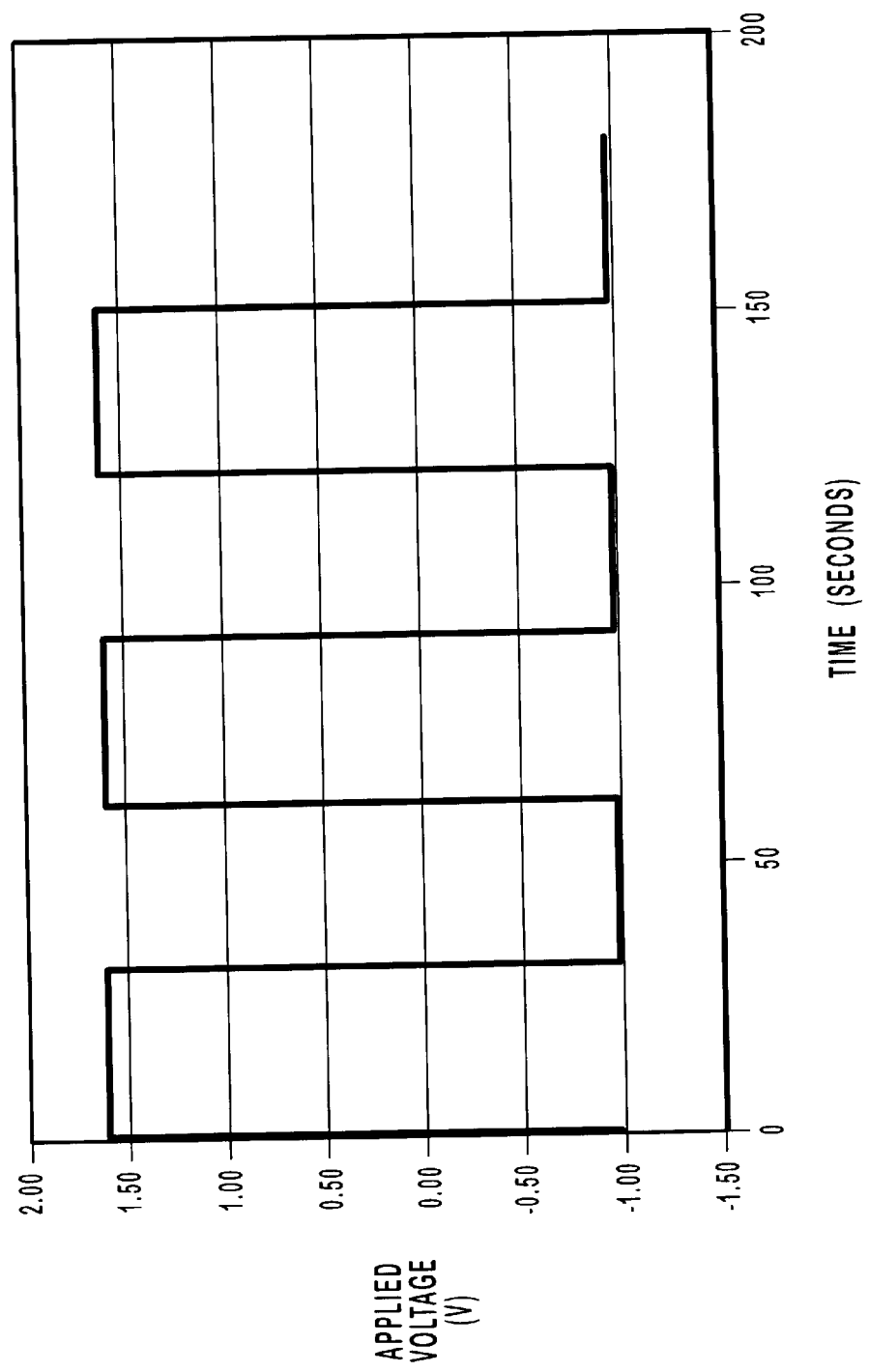
FIG. 11 is a graphical representation of the operation of a variable optical attenuator device of the present invention showing the applied voltage as a function of time.

The VOA device of Example 1 was tested to determine its dynamic switching response. FIG. 11 is a graph depicting the applied voltage as a function of time. The applied voltage of a square wave form of −1.0 V and 1.8 V was utilized, with each voltage applied for a period of 30 seconds for a total of three cycles.

Figure 12:
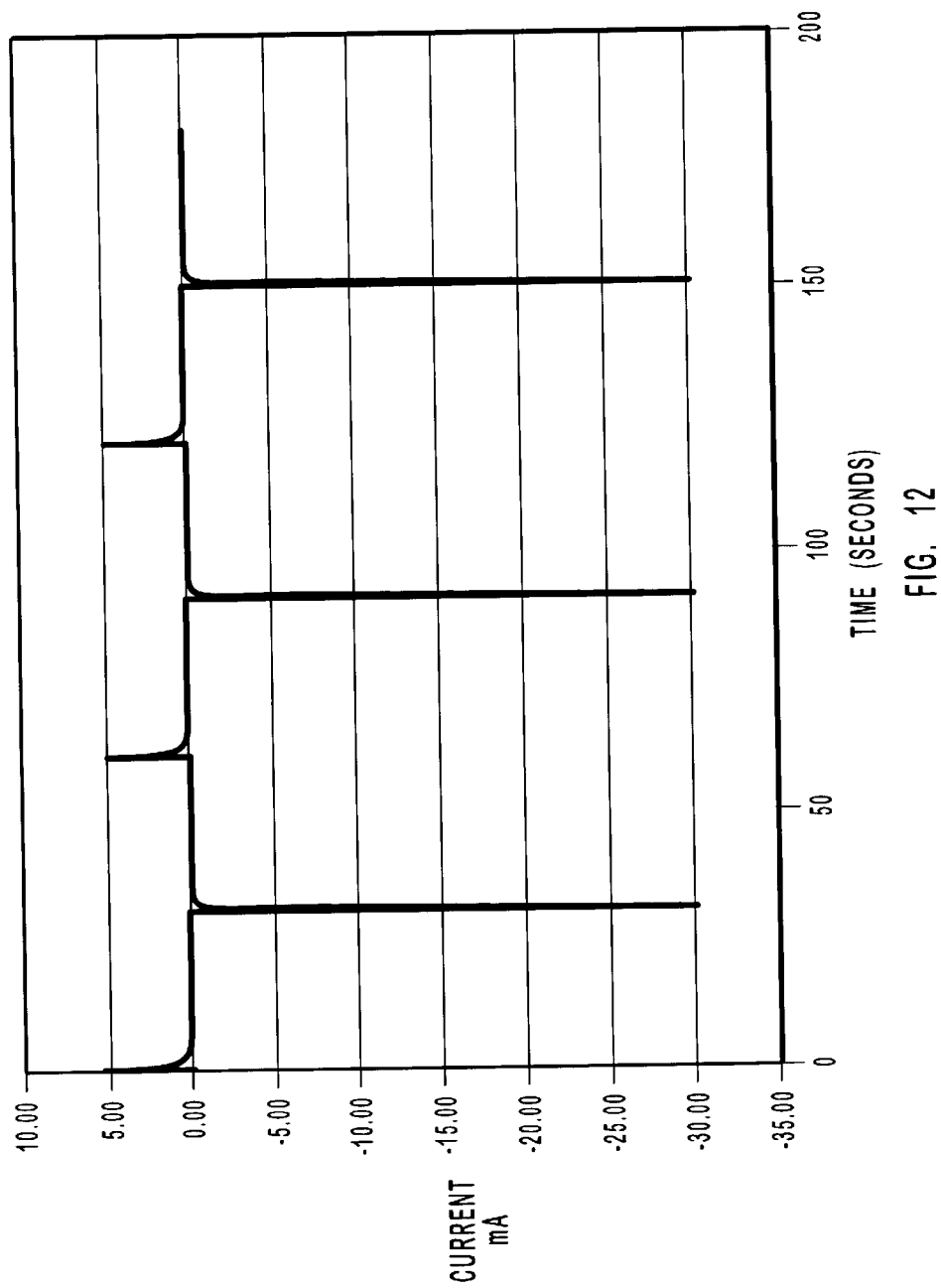
FIG. 12 is a graphical representation of the operation of a variable optical attenuator device of the present invention showing the current as a function of time.

FIG. 12 is a graph of the current response as a function of time as a result of the applied voltage. The area under the current-time curve is the amount of charge (coulombs) transferred during coloring (when applied voltage is at 1.8 V) and bleaching (when applied voltage is at −1.0 V). During the powered state (coloring) of the electrochromic structure, the current is between 0 and 1 mA, whereas the current during the off state (bleaching), as to be expected, is 0 mA.

Figure 13:
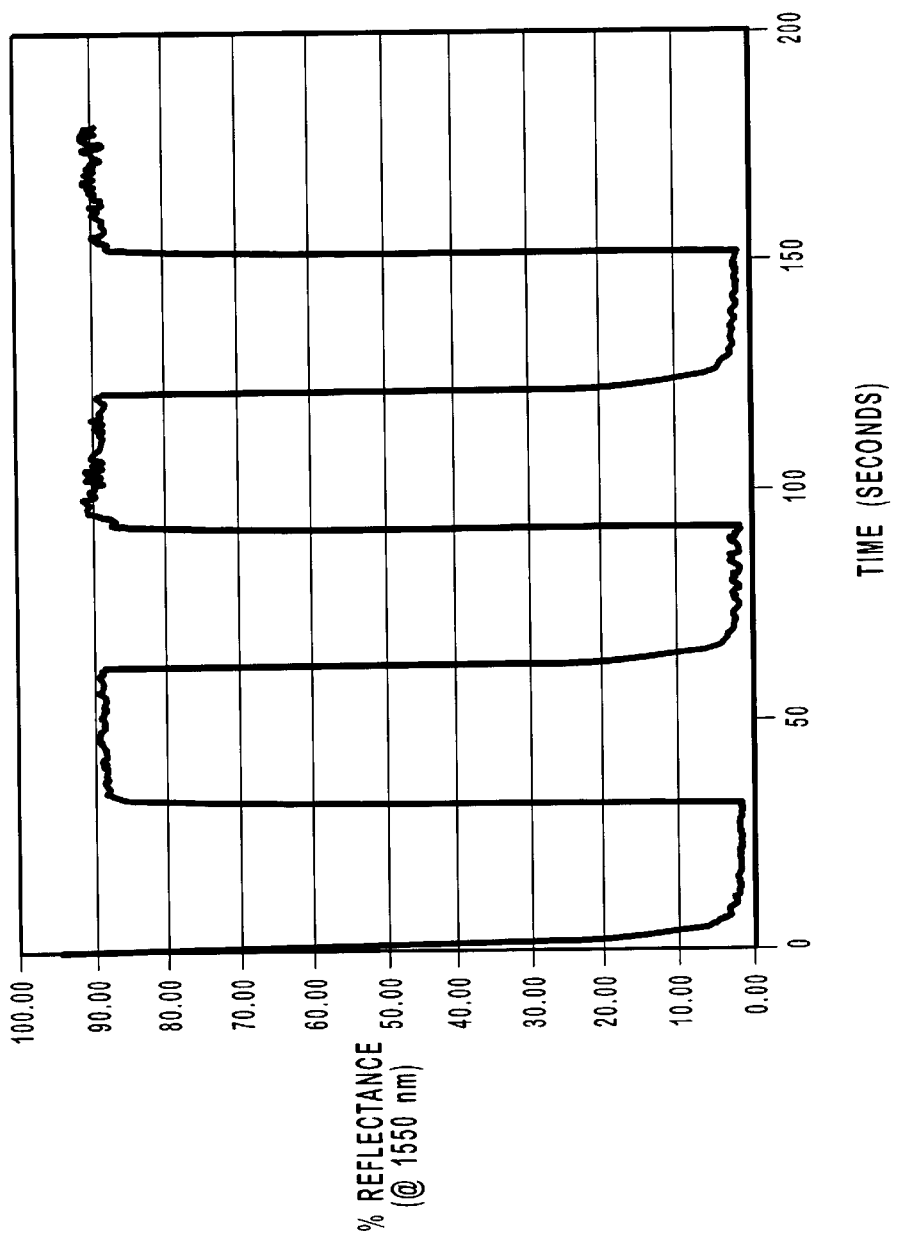
FIG. 13 is a graphical representation of the operation of a variable optical attenuator device of the present invention showing the reflectance as a function of time.

FIG. 13 is a graph of the optical response of the VOA device for the specific wavelength of 1550 nm, showing the percent reflectance as a function of time resulting from the applied voltage levels. The optical response was measured with a 1550 nm laser and optical detector. The laser was used to transmit the incident optical signal from the input optical fiber, while the optical detector analyzed the signal incident to the output optical fiber. As shown in the graph of FIG. 13, the percent reflectance ranged from about 90% during the off state to below about 5% during the powered state.

The present invention maybe embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A variable optical attenuator device comprising:

a first electrically conductive electrode that is transparent to an optical wavelength of input light;

a second electrically conductive electrode that is reflective to said optical wavelength of said input light;

an electrochromic attenuator interposed between said first and second electrically conductive electrodes, and having electrochromic attenuation properties thereof controllably adjustable in accordance with respective electrical potentials applied to said first and second electrically conductive electrodes;

a light input interface configured to direct said input light along at least one input optical path that is incident upon said first electrically conductive electrode and extends through said first electrically conductive electrode and said electrochromic attenuator, so that said input light traveling along said at least one input optical path reflects from said second electrically conductive electrode along at least one exit optical path through said electrochromic attenuator and aid first electrically conductive electrode, and exits said electrically conductive electrode; and a light output interface configured to extract output light from light traveling along said at least one exit optical path and exiting said first electrically conductive electrode, and wherein said light output interface is configured to direct said output light extracted by said light output interface along a further optical path, cascaded with said exit optical path and incident upon said first electrically conductive electrode and extending through said first electrically conductive electrode and said electrochromic attenuator, so that said extracted output light travels along said further optical path and reflects from said second electrically conductive electrode along a further exit optical path through said electrochromic attenuator and said first electrically conductive electrode and exits said first electrically conductive electrode.

2. The variable optical attenuator device according to claim 1, wherein said electrochromic attenuator comprises a solid state ion conductor, opposite surfaces of which are contiguous with a cathodically coloring layer that is contiguous with one of said first and second electrically conductive electrodes, and an anodically coloring layer that is contiguous with the other of said first and second electrically conductive electrodes.

3. The variable optical attenuator device according to claim 1, wherein said input light is infrared light.

4. The variable optical attenuator device according to claim 1, wherein said optical wavelength of said input light lies within a range of wavelengths selected from the group consisting of 1500–1700 nanometers, 1300–1600 nanometers, and 1525–1565 nanometers.

5. The variable optical attenuator device according to claim 1, wherein said light input interface comprises an input optical waveguide through which said input light travels, and a first lens interposed between said input optical waveguide and said first electrically conductive electrode, said first lens being further coupled to first exit coupling path through said first electrically conductive electrode, and wherein said light output interface comprises a transfer optical waveguide coupled with said first exit coupling path and a second lens, said second lens being configured to direct light, that is coupled thereto by said transfer optical waveguide, along said further optical path, and wherein said further exit optical path extends through said second lens to an exit optical waveguide.

6. The variable optical attenuator device according to claim 5, wherein said second electrically conductive electrode and said electrochromic attenuator are partitioned to form independently variable electrochromic attenuator portions, comprising a first variable electrochromic attenuator portion through which said first input optical path and said first exit coupling path pass, and a second variable electrochromic attenuator portion through which said further optical path and said further exit optical path pass.

7. A method of attenuating an input light beam to produce an attenuated output light beam comprising the steps of:

(a) providing a variable attenuator device, said variable attenuator device having a first electrically conductive electrode that is transparent to an optical wavelength of said input light beam, a second electrically conductive electrode that is reflective to said optical wavelength of said input light beam, and an electrochromic attenuator interposed between said first and second electrically conductive electrodes, and having electrochromic attenuation properties thereof controllably adjustable in accordance with respective electrical potentials applied to said first and second electrically conductive electrodes;

(b) directing said input light beam along an input optical path that passes through said first electrically conductive electrode and said electrochromic attenuator, so that said input light beam reflects from said second electrically conductive electrode and travels along an exit optical path that passes through said electrochromic attenuator and said first electrically conductive electrode, so that said input light beam is attenuated by said variable attenuator device as said input light beam travels therethrough along said input and exit optical paths, so as to realize said attenuated output light beam; and (c) extracting said attenuated output light beam exiting said first electrically conductive electrode, and wherein step (b) further comprises redirecting said attenuated output light beam along a further optical path, cascaded with said exit optical path and incident upon said first electrically conductive electrode and extending through said first electrically conductive electrode and said electrochromic attenuator, so that said attenuated output light beam travels through said electrochromic attenuator along said further optical path and reflects from said second electrically conductive electrode along a further exit optical path through said electrochromic attenuator and said first electrically conductive electrode, and exits said first electrically conductive electrode as a further attenuated optical beam; and wherein step (c) comprises extracting said further attenuated output light beam exiting said first electrically conductive electrode.

8. The method according to claim 7, wherein said electrochromic attenuator comprises a solid state ion conductor, opposite surfaces of which are contiguous with a cathodically coloring layer that is contiguous with one of said first and second electrically conductive electrodes, and an anodically coloring layer that is contiguous with the other of said first and second electrically conductive electrodes.

9. The method according to claim 7, wherein said input light beam is an infrared light beam.

10. The method according to claim 7, wherein said input light beam has an optical wavelength lying within a range of wavelengths selected from the group consisting of 1500–1700 nanometers, 1300–1600 nanometers, and 1525–1565 nanometers.

11. The method according to claim 7, wherein step (b) comprises (b1) coupling said input light beam through a first lens that directs said input light beam along said input optical path through said first electrically conductive electrode, (b2) coupling said exit path through said first lens to a second lens that directs said attenuated output light beam along said further optical path to realize said further attenuated optical beam, and (b3) coupling said further attenuated optical beam through said second lens.

12. The method according to claim 11, wherein said second electrically conductive electrode and said electrochromic attenuator are partitioned to form independently variable electrochromic attenuator portions, comprising a first variable electrochromic attenuator portion through which said input optical path and said exit optical path pass, and a second variable electrochromic attenuator portion through which said further optical path passes.

* * * * *